(12) United States Patent
Gist et al.

(10) Patent No.: US 9,335,082 B2
(45) Date of Patent: May 10, 2016

(54) ADAPTIVE BEATER AND SCRAPER SPEED CONTROL FOR FROZEN PRODUCT DISPENSERS (75) Inventors: David B. Gist, Grayslake, IL (US); Gregory M. Billman, Buffalo, MN (US); Santhosh Kumar, Woodridge, IL (US); Kyle Elsom, Batavia, IL (US); Nikolay Popov, Warrenville, IL (US)

(73) Assignee: Cornelius, Inc., St. Paul, MN (US)

( * ) Notice: Subject to any disclaimer, the term of this patent is extended or adjusted under 35 U.S.C. 154(b) by 0 days.

(21) Appl. No.: 13/472,206

(22) Filed: May 15, 2012

(65) Prior Publication Data

US 2012/0222434 A1 Sep. 6, 2012

Related U.S. Application Data (63) Continuation of application No. 12/070,778, filed on Feb. 21, 2008, now abandoned.

(51) Int. Cl.
*F25C 1/18* (2006.01)
*F25C 1/14* (2006.01)
*A23G 9/04* (2006.01)
*A23G 9/12* (2006.01)
*A23G 9/20* (2006.01)
*A23G 9/22* (2006.01)
*F25C 5/10* (2006.01)
*F25B 47/02* (2006.01)

(52) U.S. Cl.
CPC ............... *F25C 1/145* (2013.01); *A23G 9/045* (2013.01); *A23G 9/12* (2013.01); *A23G 9/20* (2013.01); *A23G 9/228* (2013.01); *F25C 5/10* (2013.01); *F25B 47/022* (2013.01); *F25B 2600/0251* (2013.01)

(58) Field of Classification Search
CPC ........... F25C 1/145; F25C 5/10; A23G 9/045; A23G 9/12; A23G 9/228; A23G 9/20; F25B 47/022; F25B 2600/0251
USPC ........... 62/68, 135–136, 342–343, 222, 228.2
See application file for complete search history.

(56) References Cited

U.S. PATENT DOCUMENTS

| | | | | |
|---|---|---|---|---|
| 3,608,779 | A * | 9/1971 | Cornelius | 222/54 |
| 3,650,121 | A * | 3/1972 | Kimpel et al. | 62/136 |
| 3,715,893 | A * | 2/1973 | Werner | 62/135 |
| 3,898,859 | A * | 8/1975 | Duke | 62/135 |
| 3,939,667 | A * | 2/1976 | Halverson | 62/188 |
| 3,995,770 | A * | 12/1976 | Schwitters | 222/56 |
| 4,201,558 | A * | 5/1980 | Schwitters et al. | 62/70 |
| 4,707,997 | A * | 11/1987 | Bigler et al. | 62/341 |
| 4,736,593 | A * | 4/1988 | Williams | 62/136 |
| 5,095,710 | A * | 3/1992 | Black et al. | 62/68 |
| 5,103,649 | A * | 4/1992 | Kieffer | 62/136 |
| 5,709,095 | A * | 1/1998 | Johnson | 62/136 |
| 6,220,047 | B1 * | 4/2001 | Vogel et al. | 62/342 |
| 6,553,779 | B1 * | 4/2003 | Boyer et al. | 62/342 |

(Continued)

*Primary Examiner* — Emmanuel Duke
(74) *Attorney, Agent, or Firm* — Andrus Intellectual Property Law, LLP (57) ABSTRACT A controller for a drive motor for a scraper of a frozen product dispenser operates the drive motor to rotate the scraper at selected ones of a plurality of different speeds within a freeze barrel of the dispenser, in accordance with the values of sensed operating parameters of the dispenser. The arrangement provides for rotation of the scraper at speeds appropriate for, but no greater than required for, the then existent operating condition of the dispenser.

10 Claims, 9 Drawing Sheets

(56) References Cited

U.S. PATENT DOCUMENTS

| | | | |
|---|---|---|---|
| 6,637,214 B1* | 10/2003 | Leitzke | A23G 9/163 62/342 |
| 2002/0108964 A1* | 8/2002 | Staten et al. | 222/1 |
| 2003/0080644 A1* | 5/2003 | Nelson et al. | 310/196 |
| 2007/0141206 A1* | 6/2007 | Bramley et al. | 426/100 |
| 2008/0006050 A1* | 1/2008 | Gist et al. | 62/354 |

* cited by examiner

| OPTION 1 | | |
|---|---|---|
| SPEED | RPM | MODE |
| High2 | Same as High1 | Defrost. |
| High1 | 240 | Compressor-ON; except Defrost. |
| Low2 | 90 | Compressor-OFF; except Sleep, Syrup-sold-out, Water -out, $CO_2$-out & Error. |
| Low1 | 60 | Sleep, Syrup-sold-out, Water -out, $CO_2$-out. |
| Off | 0 | Error. |

Fig. 7

| OPTION 2 | | |
|---|---|---|
| SPEED | RPM | MODE |
| High2 | Same as High1 | Defrost. |
| High1 | 240 | Compressor-ON; except Defrost. |
| Low2 | 90 | Compressor-OFF; except Sleep, Syrup-sold-out, Water -out, $CO_2$-out & Error. |
| Low1 | 60 | Unused |
| Off | 0 | Sleep, Syrup-sold-out, Water -out, $CO_2$-out & Error. |

Fig. 8

| OPTION 3 | | |
|---|---|---|
| SPEED | RPM | MODE |
| High2 | >240 | Defrost. |
| High1 | 240 | Compressor-ON; except Defrost. |
| Low2 | 90 | Compressor-OFF; except Sleep, Syrup-sold-out, Water –out, CO2-out & Error. |
| Low1 | 60 | Sleep, Syrup-sold-out, Water –out, CO2-out. |
| Off | 0 | Error. |

Fig. 9

| OPTION 4 | | |
|---|---|---|
| SPEED | RPM | MODE |
| High2 | >240 | Defrost. |
| High1 | 240 | Compressor-ON; except Defrost. |
| Low2 | 90 | Compressor-OFF; except Sleep, Syrup-sold-out, Water -out, CO2-out & Error. |
| Low1 | 60 | Unused |
| Off | 0 | Sleep, Syrup-sold-out, Water -out, CO2-out & Error. |

Fig. 10

| OPTION 5 | | |
|---|---|---|
| SPEED | RPM | MODE |
| High2 | The same as High1 | Defrost. |
| High2 | >240 | Defrost. |
| High1 | 240 | Compressor-ON; except Defrost. |
| Low2 | 90 | Compressor-OFF; except Sleep, Syrup-sold-out, Water –out, CO2-out & Error. |
| Low1 | 60 | Sleep, Syrup-sold-out, Water –out, CO2-out |
| Off | 0 | Sleep, Syrup-sold-out, Water –out, CO2-out |
| Off | 0 | Error. |

Fig. 11

| OPTION 6 | | |
|---|---|---|
| SPEED | RPM | MODE |
| High2 | The same as High1 | Defrost. |
| High2 | >240 | Defrost. |
| High1 | 240 | Compressor-ON; except Defrost. |
| Low2 | 90 | Compressor-OFF; except Sleep, Syrup-sold-out, Water –out, CO2-out & Error. |
| Low1 | 60 | Sleep/Syrup-sold-out error. |
| Off | 0 | Error; except Syrup-sold-out. |

Fig. 12

ADAPTIVE BEATER AND SCRAPER SPEED CONTROL FOR FROZEN PRODUCT DISPENSERS

This application is a continuation of application Ser. No. 12/070,778, filed Feb. 21, 2008 and now abandoned.

FIELD OF THE INVENTION

The present invention relates to machines for making and dispensing frozen products, and in particular to an adaptive controller for a motor driven beater bar and scraper of a frozen product dispenser.

BACKGROUND OF THE INVENTION

Frozen product machines, such as frozen carbonated beverage (FCB) machines, utilize a freezing cylinder or freeze barrel for producing a slush beverage for frozen food product. An evaporator coil is wrapped around the exterior of the barrel for cooling the contents thereof. A beater bar and scraper assembly extends along the central axis of the barrel and is rotated by a motor to scrape thin iced or frozen layers of the beverage or food product from the inner surface of the barrel for dispensing to customers.

Typically, the beater bar and scraper assemblies of frozen product machines are rotated by a motor at a fixed rotational speed. Normally, the fixed rotational speed is set to accommodate the highest drink frozen food product or draw rate demand. This leaves the beater bar and scraper assembly rotating faster than necessary for other and lower frozen product demand levels that do not require a high speed of rotation. Among the disadvantages of operating the beater bar and scraper assembly continuously at the highest required speed is that for much of the time, when drink draw rates are below maximum, more power is required to operate the drive motor than would be required at a lower speed of the motor, there is increased wear of mechanical parts, and when the motor is located within the freeze barrel, more heat is generated by and transferred from the motor to the inside of the barrel, resulting in increased freeze barrel cooling requirements and inconsistencies in product quality.

OBJECT OF THE INVENTION

A primary object of the present invention is to provide an adaptive control for operating a motor driven beater bar and scraper assembly within a freeze barrel of a frozen product dispenser, which adjusts the speed of operation of the beater bar and scraper assembly in accordance with real-time operating conditions of the dispenser.

SUMMARY OF THE INVENTION

In accordance with the invention, there is provided a frozen product dispenser, comprising a freeze barrel; means for delivering liquid product to the freeze barrel; a refrigeration system operable in a chilling cycle to freeze product in the freeze barrel and in a defrost cycle to defrost product in the freeze barrel; a scraper in the freeze barrel; and means for rotating the scraper in the freeze barrel. Also included are means for sensing the values of a plurality of different operating parameters of the frozen product dispenser; and an adaptive control responsive to the sensed values of the operating parameters of the frozen product dispenser for controlling the means for rotating to rotate the scraper in the freeze barrel at a selected one of at least two different speeds.

The adaptive control may be responsive to the refrigeration system operating in a chilling cycle to control the means for rotating to rotate the scraper in the freeze barrel at a first speed, and the refrigeration system operating in a defrost cycle to control the means for rotating to rotate the scraper in the freeze barrel at a second and different speed. The refrigeration system has a compressor that is cycled on and off in operation of the refrigeration system, and individual ones of the plurality of sensed operating parameters of the product dispenser can comprise at least two of the compressor being on, the compressor being off, and exhaustion of a supply of liquid product for delivery to the freeze barrel.

The product dispensed by the frozen product dispenser can be a beverage product, in which case the means for delivering liquid product to the freeze barrel can comprises means for delivering to the freeze barrel a beverage syrup from a source of beverage syrup, a diluent for the syrup from a source of diluent, and carbonating gas from a source of carbonating gas to carbonate the beverage product. When a frozen beverage product is dispensed, the adaptive control may be responsive to the refrigeration system operating in a defrost cycle to control the means for rotating to rotate the scraper in the freeze barrel at a first and relatively high speed; the compressor being on, except during a defrost cycle of the refrigeration system, to control the means for rotating to rotate the scraper in the freeze barrel at a second and relatively high speed; the compressor being off, except upon occurrence of exhaustion of a source of any one of the syrup, diluent and carbonating gas, to operate the means for rotating to rotate the scraper in the freeze barrel at a third and relatively low speed; and exhaustion of a source of any one of the syrup, diluent and carbonating gas to control the means for rotating to rotate the scraper in the freeze barrel at a fourth and relatively low speed. The first relatively high speed may be at least equal to the second relatively high speed; the third relatively low speed may greater than the fourth relatively low speed, and the fourth relatively low speed may be zero. Also, the first relatively high speed may be greater than the second relatively high speed.

Further, the adaptive control may be responsive to the sensed parameter values to control the means for rotating to rotate the scraper in the freeze barrel at selected ones of a plurality of different speeds that are in accordance with the then sensed values of the parameters of the frozen product dispenser, but at no faster a speed than is required for the then sensed values.

The invention also contemplates a method of operating a frozen product dispenser, the method comprising the steps of delivering liquid product to a freeze barrel of the dispenser; operating a refrigeration system in a chilling cycle to freeze product in the freeze barrel and in a defrost cycle to defrost product in the freeze barrel; sensing the values of a plurality of different operating parameters of the frozen product dispenser; rotating a scraper in the freeze barrel; and adaptively controlling, in response to the sensed values of the parameters, operation of the rotating step to rotate the scraper in the freeze barrel at a selected one of at least two different speeds.

The adaptively controlling step may be responsive to the refrigeration system operating in a chilling cycle to control the rotating step to rotate the scraper in the freeze barrel at a first speed, and to the refrigeration system operating in a defrost cycle to control the rotating step to rotate the scraper in the freeze barrel at a second and different speed. The refrigeration system has a compressor that is cycled on and off in operation of the refrigeration system, and the sensed operating parameters include at least two of the compressor being on, the compressor being off, and exhaustion of a supply of liquid product for delivery to the freeze barrel. The product may be a beverage product, in which case the delivering step can comprise the steps of delivering to the freeze barrel a beverage syrup from a source of beverage syrup and a diluent for the syrup from a source of diluent, and the step of carbonating the beverage product with carbonating gas from a source of carbonating gas can be included. The adaptive controlling step may be responsive to the refrigeration system operating in a defrost cycle to control the rotating step to rotate the scraper in the freeze barrel at a first and relatively high speed; the compressor being on, except during a defrost cycle of the refrigeration system, to control the rotating step to rotate the scraper in the freeze barrel at a second and relatively high speed; the compressor being off, except upon occurrence of exhaustion of a source of any one of the syrup, diluent and carbonating gas, to control the rotating step to rotate the scraper in the freeze barrel at a third and relatively low speed; and exhaustion of a source of any one of the syrup, diluent and carbonating gas to control the rotating step to rotate the scraper in the freeze barrel at a fourth and relatively low speed. The first relatively high speed may be at least equal to the second relatively high speed; and the third relatively low speed may be greater than the fourth relatively low speed. The fourth relatively low speed may be zero, and the first relatively high speed may be greater than the second relatively high speed.

In addition, the adaptively controlling step may be responsive to the sensed parameter values to control the rotating step to rotate the scraper in the freeze barrel at selected ones of a plurality of different speeds that are in accordance with the then sensed values of the parameters, but at no faster a speed than is required for the then sensed values.

DETAILED DESCRIPTION

The invention provides a novel adaptive control for varying the rotational speed of a motor driven beater bar and scraper assembly within a freeze barrel of a frozen product dispenser, such that the beater bar and scraper assembly is rotated at speeds appropriate for, and no faster than is required for, the then existing operating conditions or parameters of the dispenser. As compared to the conventional technique of rotating the beater bar and scraper assembly at a fixed speed, which normally is selected to be in accordance with the highest frozen product draw rate demand anticipated, the adaptive control of the invention rotates the beater bar and scraper assembly at selected ones of a plurality of different speeds, such that the beater bar and scraper assembly is rotated at speeds appropriate for the then existent operating conditions of the dispenser. For example, when the freeze barrel is being defrosted and the refrigeration load on the barrel is off, a maximum speed of rotation of the beater bar and scraper assembly is not required for the purpose of preparing frozen product for dispensing to a customer, and under that circumstance the assembly can be rotated at a slower speed, or not rotated at all. However, it is recognized that rotating the beater bar and scraper assembly at its maximum speed could be advantageous in facilitating defrosting of the contents of the freeze barrel within a shorter time period, and the invention therefore contemplates that under the condition of a defrost cycle, the beater bar and scraper assembly can be rotated either at maximum speed or at a much reduced speed, including off, depending upon the circumstances of the situation and what is desired to be accomplished. Advantages to operating the beater bar and scraper at reduced speeds when maximum speed is not required are: (1) lower wattage is required to operate a drive motor for the beater bar and scraper assembly; (2) there is less wear on mechanical parts; (3) less heat is generated by the drive motor and added to the freeze barrel by the motor, when the motor is located within the barrel, which results in greater product quality consistency for longer periods and fewer cycles of the refrigeration system compressor, which reduces the energy requirements of the refrigeration system and extends compressor life.

Figure 1:
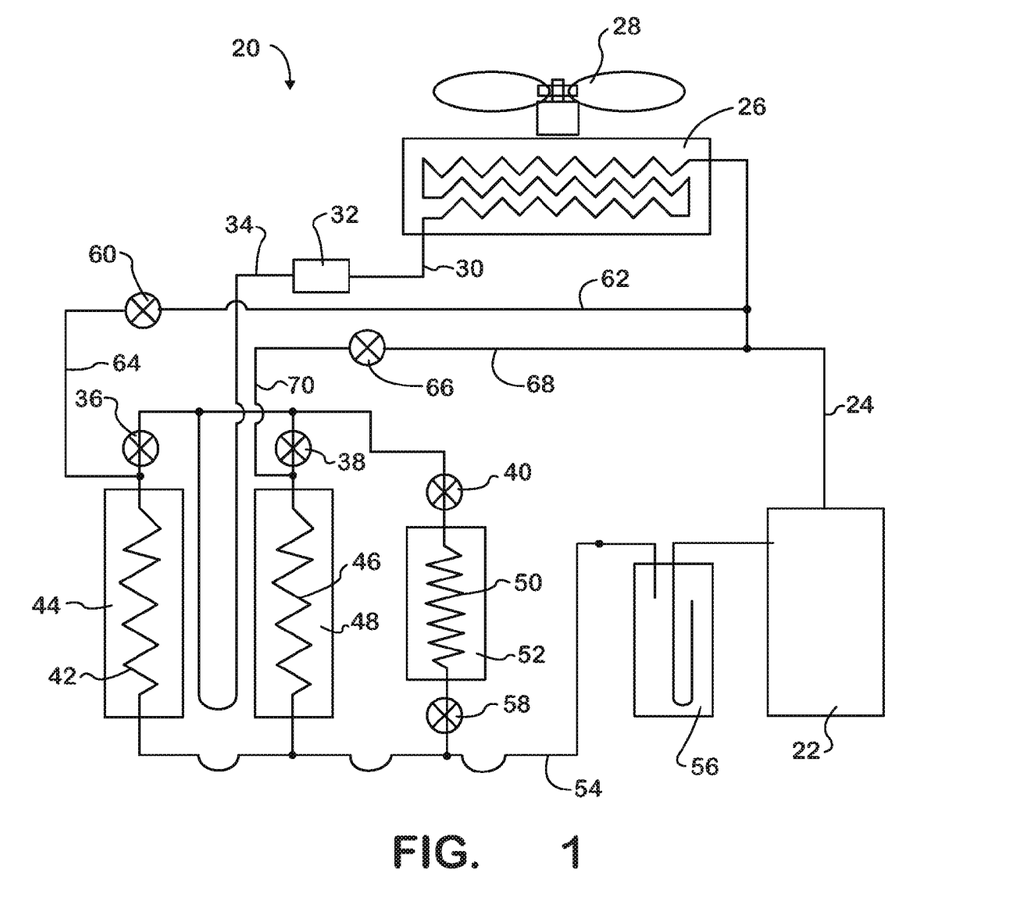
FIG. 1 is a schematic representation of a refrigeration system of a type that may be used to chill each of two beverage product freeze barrels and a beverage product pre-chiller of a frozen beverage product dispenser.

Referring to FIG. 1, a refrigeration system of a type as may be used with a frozen product dispenser is indicated generally at 20. The refrigeration system may be of a type as is used in practice of a prescriptive refrigerant flow control as disclosed in co-pending application Ser. No. 11/974,061, filed Oct. 11, 2007, the teachings of which are incorporated herein by reference. The refrigeration system includes a variable speed/capacity compressor 22, which may be a scroll or a reciprocating compressor that is provided with a variable-frequency drive for applying to an ac motor of the compressor an ac voltage having a frequency selected to provide a desired speed of operation of the motor and, thereby, a desired output capacity of the compressor. Alternatively, for the purposes of the present invention, the compressor can be a single speed compressor. In either case, hot refrigerant at an outlet from the compressor is coupled through a refrigerant line 24 to an inlet to a condenser 26, through which air is drawn by a fan 28 to cool the refrigerant. Cooled refrigerant at an outlet from the condenser flows through a refrigerant line 30 to and through a filter/dryer 32 and a refrigerant line 34 to inlets to each of three electronically controlled expansion valves 36, 38 and 40, which may be of the stepper motor driven or pulse valve modulated type, such that the valves may be controlled to meter selected refrigerant flows. Refrigerant exiting an outlet from the expansion valve 36 is delivered to an inlet to an evaporator coil 42 that is heat transfer coupled to a first beverage product freeze barrel 44 of an FCB dispenser to chill the barrel and freeze beverage product in the barrel. Refrigerant exiting an outlet from the expansion valve 38 is delivered to an inlet to an evaporator coil 46 that is heat transfer coupled to a second beverage product freeze barrel 48 of the dispenser to chill the barrel and freeze beverage product in the barrel. Refrigerant exiting an outlet from the expansion valve 40 is delivered to an inlet to an evaporator coil 50 that is heat transfer coupled to a pre-chiller 52 of the dispenser to chill the pre-chiller and, as will be described, to chill beverage product flowed through the pre-chiller before being introduced into the freeze barrels 44 and 48. After passing through each of the freeze barrel evaporators 42 and 46, refrigerant exiting the evaporators flows through a refrigerant line 54 and an accumulator 56 to an inlet to the compressor 22. After passing through the pre-chiller evaporator 50, refrigerant exiting the evaporator flows through an evaporator pressure regulating valve 58 and then through the refrigerant line 54 and accumulator 56 to the inlet to the compressor. The evaporator pressure regulating valve 58 serves to prevent the pressure of refrigerant in the evaporator 50 from falling below a lower limit, thereby to prevent freezing of beverage product in the pre-chiller 52.

The refrigeration system 20 has two defrost circuits, a first one of which is for defrosting the freeze barrel 44 and includes a solenoid operated refrigerant valve 60 having an inlet coupled directly to hot refrigerant at the outlet from the compressor 22 through a refrigerant line 62 and an outlet coupled to the inlet to the freeze barrel evaporator 42 through a refrigerant line 64. A second defrost circuit is for defrosting the freeze barrel 48 and includes a solenoid operated refrigerant valve 66 having an inlet coupled directly to hot refrigerant at the outlet from the compressor 22 through a refrigerant line 68 and an outlet coupled to the inlet to the freeze barrel evaporator 46 through a refrigerant line 70. The defrost circuits are operated to heat the evaporators 42 and 46 to defrost the beverage product barrels 44 and 48 in defrost cycles of the refrigeration system. When the refrigeration system is operating to chill the product freeze barrel 44, the refrigerant valve 60 is closed and the expansion valve 36 is open, and when the refrigeration system is being operated in a defrost mode to defrost product in the freeze barrel 44, the refrigerant valve 60 is open and the expansion valve 36 is closed. Similarly, when the refrigeration system is operating to chill the product freeze barrel 48, the refrigerant valve 66 is closed and the expansion valve 38 is open, and when the refrigeration system is being operated in a defrost mode to defrost product in the freeze barrel 48, the refrigerant valve 66 is open and the expansion valve 38 is closed.

The refrigeration system 20 is adapted for use with an FCB dispenser that has a pre-chiller 52. To provide chilling for an FCB dispenser that does not have a pre-chiller, a refrigeration system of a type shown in FIG. 2 and indicated generally at 72 may be used. The refrigeration system 72 is similar to the refrigeration system 20, and like reference numerals have been used to denote like components. A difference between the two systems is that since the system 72 does not provide for cooling of a pre-chiller 52, it does not have an evaporator coil 50, an electronically controlled expansion valve 40 and an evaporator pressure regulating valve 58. Otherwise, the structure and operation of the two refrigeration systems 20 and 72 are similar.

Figure 2:
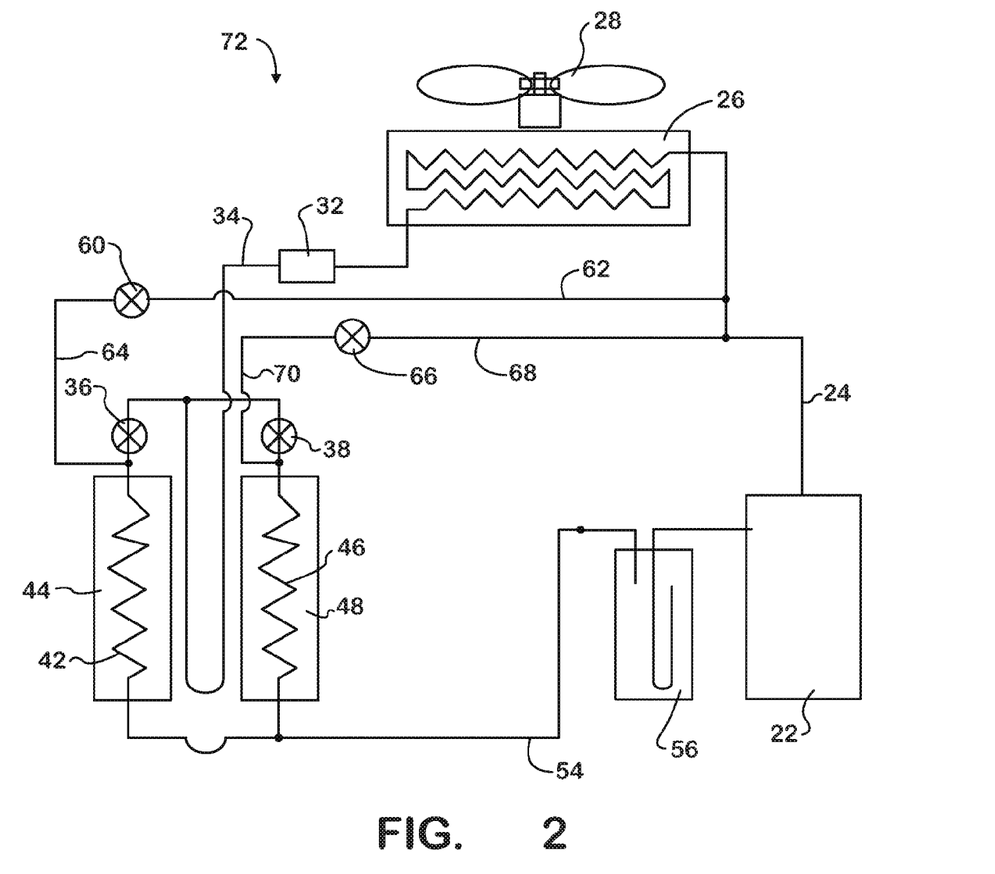
FIG. 2 is similar to the system of FIG. 1, except that the refrigeration system does not provide chilling for a pre-chiller.

While each of the refrigeration systems 20 and 72 are structured to provide chilling for two product freeze barrels, since that enables two different flavors of frozen beverage products to be prepared by a frozen beverage product machine, the teachings of the invention may also be used with a frozen beverage product machine that has only a single product freeze barrel, or with one that has more than two product freeze barrels. As is understood, each freeze barrel has its own beater bar and scraper assembly, and the number of freeze barrels of a machine determines the number of beater bar and scraper assemblies embodied in the machine. A separate drive motor is provided for each beater bar and scraper assembly.

Figure 3:
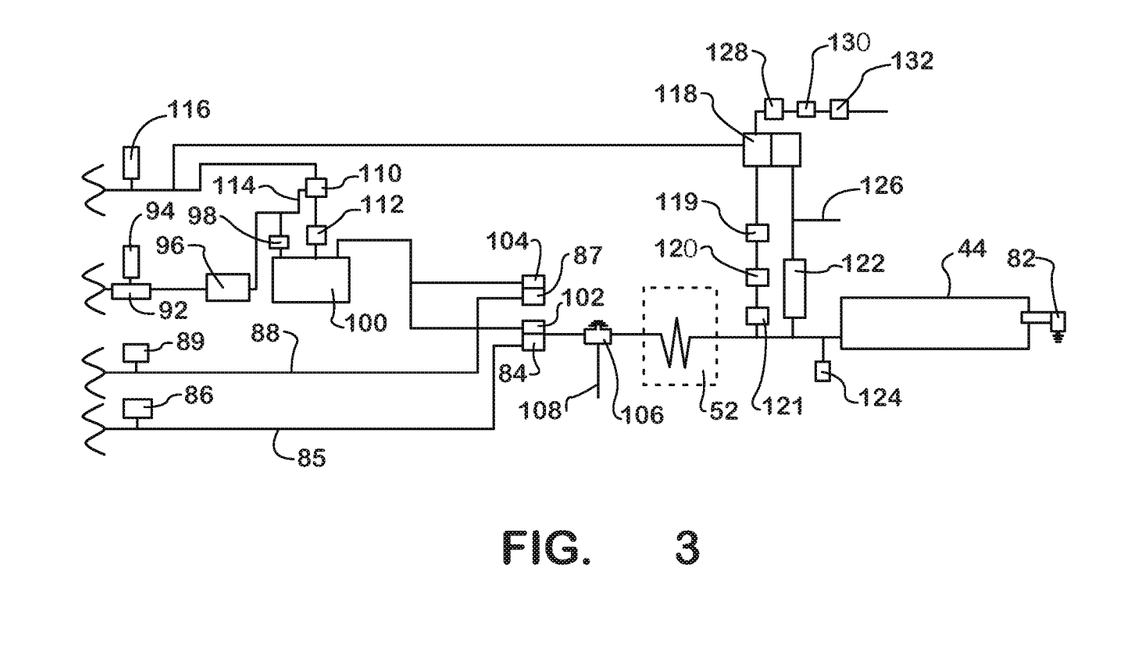
FIG. 3 is a schematic representation of one possible type of frozen beverage product dispensing system having two beverage product freeze barrels and a pre-chiller that are chilled by the refrigeration system of FIG. 1, with which the adaptive beater bar and scraper speed control of the invention may advantageously be used.

One FCB dispenser that may utilize the refrigeration system 20 and with which the adaptive control for a motor driven beater bar and scraper assembly may be used is shown in FIG. 3 and indicated generally at 80. The dispenser includes the two beverage product freeze barrels 44 and 48, only the barrel 44 being shown. This particular embodiment of FCB dispenser utilizes ambient temperature carbonation, and while not specifically shown in FIG. 3 (but shown in FIG. 1), it is understood that the evaporator coil 42 is heat transfer coupled to the barrel 44 to chill the barrel in order to freeze beverage product mixture delivered into the barrel. With reference to the portion of the dispenser 80 shown and associated with the freeze barrel 44, it being understood that a like description applies to a similar but less than fully shown portion of the dispenser associated with the freeze barrel 48, a frozen beverage product dispensing valve 82 is coupled to the barrel 44 for service of frozen beverage product to customers. To deliver liquid beverage components to the barrel 44 for being frozen, an externally pumped beverage syrup concentrate is delivered to an inlet to a syrup brixing valve 84 through a syrup line 85, to which line is coupled a sensor 86 for detecting a syrup-out condition. To deliver liquid beverage components to the barrel 48 (shown in FIG. 1), an externally pumped beverage syrup concentrate is delivered to an inlet to a syrup brixing valve 87 through a syrup line 88, to which line is coupled a sensor 89 for detecting a syrup-out condition. A potable water supply, such as from a city main, is connected to the dispenser through a strainer/pressure regulator 92, to which is coupled a pressure switch 94 for detecting a water-out condition. From the strainer/pressure regulator, the water passes through a carbonator pump 96 and a check valve 98 to a water inlet to a carbonator 100. The carbonator 100 operates in a manner well understood in the art to carbonate water introduced therein, and carbonated water at an outlet from the carbonator is delivered to each of an inlet to a water brixing valve 102 associated with the syrup brixing valve 84 and to an inlet to a water brixing valve 104 associated with the syrup brixing valve 87. The brixing valves 104, 87 comprise an associated pair of brixing valves that delivers a water and syrup mixture, in a selected and adjustable ratio, through an associated fluid circuit (not shown) that includes the pre-chiller 52, to the freeze barrel 48. The brixing valves 102, 84 also comprise an associated pair of brixing valves that delivers a water and syrup mixture, in a selected and adjustable ratio, through an associated fluid circuit that includes the pre-chiller 52, to the freeze barrel 44. The water and syrup beverage mixture provided at an outlet from each pair of brixing valves is in a ratio determined by the settings of the individual valves of each pair, and the mixture passed though the brixing valves 102, 84 is delivered through a 3-way valve 106 and the pre-chiller 52 to the freeze cylinder or barrel 44, it being understood that, although not shown (but shown in FIG. 1), the evaporator coil 50 is heat exchange coupled to the pre-chiller. The 3-way valve 106 has an outlet 108 leading to atmosphere, by means of which a sample of the water and syrup mixture output by the pair of brixing valves 102 and 84 may be collected for analysis, so that any necessary adjustments may be made to the brixing valves to provide a desired water/syrup ratio.

To carbonate water in the carbonator tank 100, an externally regulated supply of $CO_2$ is coupled through a temperature compensated pressure regulator 110 and a check valve 112 to the carbonator, the regulator 110 including a capillary sensor 114 for detecting the temperature of incoming water. A sensor 116 detects a $CO_2$-out condition, and the supply of $CO_2$ is also coupled to inlets to each of two $CO_2$ pressure regulators of a manifold 118. An outlet from a first one of the manifold pressure regulators is coupled through a solenoid shut-off valve 119, a $CO_2$ flow control valve 120 and a $CO_2$ check valve 121 to an inlet to the freeze barrel 44. In addition, $CO_2$ at an outlet from a second one of the manifold pressure regulators is coupled to an upper opening to an expansion tank 122, a lower opening to which is coupled to the water and syrup mixture line between the pre-chiller and freeze barrel. The flow control valve 120 accommodates adjustment of the carbonation level in the barrel 44 by enabling the introduction of $CO_2$ into the barrel for a brief period before a mixture of water and syrup is delivered into the barrel. A pressure transducer 124 monitors the pressure of the water and syrup mixture in the barrel 44 and serves as a pressure cut-in/cut-out sensor to control filling and refilling of the barrel with liquid beverage product to be frozen in the barrel. As is understood by those skilled in the art, when the pressure transducer 124 detects a lower limit cut-in pressure in the barrel, for example 23 psi, the pair of brixing valves 102, 84 is opened for flow of a water and syrup mixture to and into the barrel to refill the barrel, until the pressure transducer detects an upper limit cut-out pressure, for example 29 psi, whereupon the pair of brixing valves is closed. During flow of the water and syrup mixture to the barrel, the mixture is cooled as it flows through an associated circuit in the pre-chiller 52. As the beverage mixture is frozen in the barrel 44 it expands, and the expansion chamber 122 accommodates such expansion.

As mentioned, the dispenser 80 includes the freeze barrel 48 and, therefore, includes further structure (not shown) that is generally duplicative of that to the right of the pair of brixing valves 102, 84 and that accommodates delivery of a water and syrup mixture from the pair of brixing valves 104, 87 to the barrel 48, except that the beverage mixture does not flow through a separate pre-chiller, but instead flows through an associated circuit of the pre-chiller 52. In addition, a line 126 delivers $CO_2$ to an upper opening to an expansion chamber, a lower opening from which couples to an inlet to the barrel 48, and to accommodate addition of $CO_2$ to the barrel 48, the outlet from the manifold first $CO_2$ pressure regulator is also coupled through a solenoid shut-off valve 128, a $CO_2$ flow control valve 130 and a $CO_2$ check valve 132 to the inlet to the barrel.

In operation of the FCB machine 80, liquid beverage components are introduced through the pre-chiller and into the freeze barrels 44 and 48 by their respective pairs of brixing valves 84, 102 and 87, 104. The refrigeration system 20 provides chilling for the pre-chiller 52 via the heat transfer coupled evaporator 50, so that the liquid beverage components delivered into the freeze barrels 44 and 48 are chilled. The refrigeration system also provides chilling for the freeze barrels 44 and 48 via the respective heat transfer coupled evaporators 42 and 46, to freeze the liquid beverage components in the barrels while the components are agitated by a motor driven beater bar and scraper assembly, all in a manner well understood by those skilled in the art. Frozen beverage product prepared within the freeze barrels is dispensed for service to customers, such a by the dispense valve 82 coupled to the freeze barrel 44.

Figure 4:
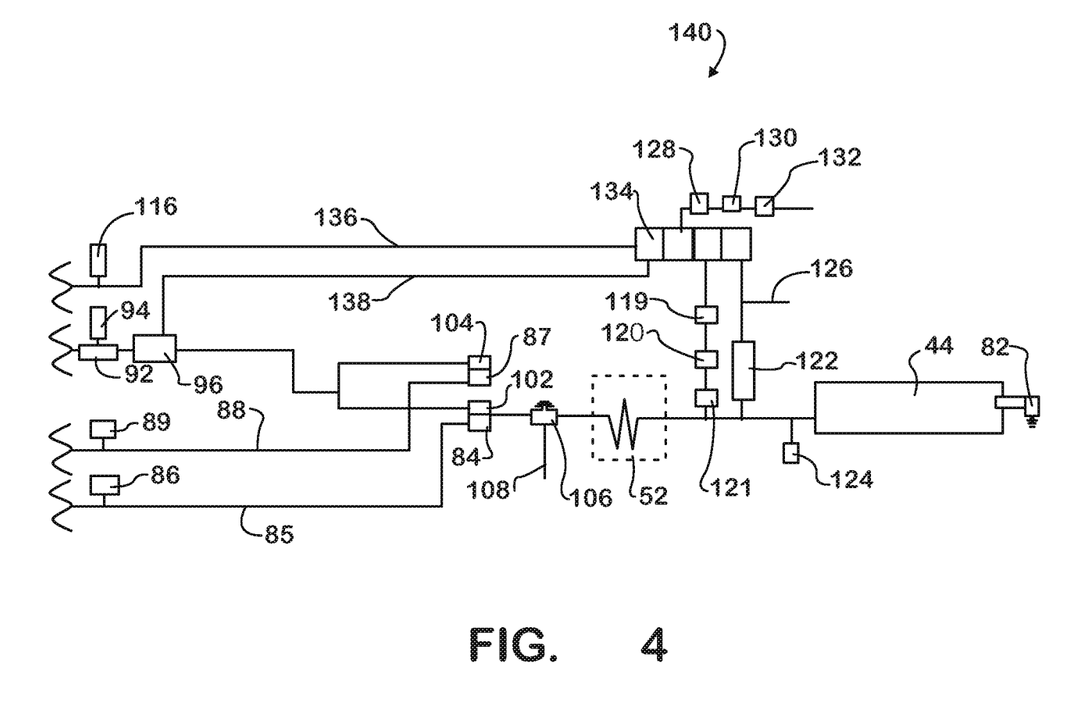
FIG. 4 is a schematic representation of a frozen product dispensing system utilizing chilled carbonation, which also is of a type with which the adaptive beater bar and scraper speed control of the invention may advantageously be used.

Another type of FCB dispenser with which the refrigeration system 20 may be used is shown in FIG. 4 and indicated generally at 140. The dispenser 140 is somewhat similar to the FCB dispenser 80 of FIG. 3, except that it utilizes chilled carbonation, and like reference numerals have been used to denote like components. With reference to the portion of the FCB dispenser 140 associated with the freeze barrel 44, it being understood that a similar description would apply to a similar, but only partially shown, structure of the dispenser associated with the freeze barrel 48, the frozen beverage product dispensing valve 82 is coupled to the barrel 44 for service of frozen beverages to customers. To deliver liquid beverage components to the barrel 44 for being frozen in the barrel, an externally pumped beverage syrup concentrate is delivered to the syrup brixing valve 84 through the syrup line 85, to which is coupled the sensor 86 that detects a syrup-out condition, and to deliver beverage components to the barrel 48, an externally pumped beverage syrup concentrate is delivered to the inlet to the syrup brixing valve 87 through the syrup line 88, to which is coupled the sensor 89 for detecting a syrup-out condition. A potable water supply connects to the dispenser through a strainer/pressure regulator 92, to which is coupled a pressure switch 94 for detecting a water-out condition. The outlet from the strainer/pressure regulator 92 is coupled to an inlet to a $CO_2$ driven water pump 96. Unlike the FCB dispenser 80 of FIG. 3, in which the outlet from the water pump is connected to an inlet to an ambient temperature carbonator 100, in the FCB dispenser 140, an outlet from the water pump 96 is fluid coupled directly to the inlet to each of the water brixing valve 102 associated with the syrup valve 84 and the water brixing valve 104 associated with the syrup valve 87. The brixing valves 104, 87 deliver a water/syrup mixture in a selected ratio, determined by the settings of the valves, through an associated fluid circuit (not shown) that includes the pre-chiller 52 to the freeze barrel 48, and the brixing valves 102, 84 deliver a water/syrup mixture in a selected ratio, determined by the settings of the valves, through the pre-chiller 52 to an inlet to the freeze barrel 44. The water/syrup mixture delivered from the brixing valves 102, 84 flows through the 3-way valve 106 and the pre-chiller 52 to the inlet to the barrel 44, the outlet 108 from the valve 106 providing the means by which a sample of the water/syrup mixture may be collected for analysis.

An externally regulated supply of $CO_2$ is coupled to inlets to each of four $CO_2$ pressure regulators of a manifold 134 through a line 136, to which is coupled the sensor 116 for detecting a $CO_2$-out condition. An outlet from a first one of the manifold pressure regulators is coupled through a line 138 to the $CO_2$ driven water pump 96 to operate the pump. An outlet from a second one of the manifold $CO_2$ pressure regulators is coupled through the solenoid shut-off valve 119, the $CO_2$ orifice 120 and the $CO_2$ check valve 121 to the chilled water/syrup mixture flowing from the pre-chiller 52 to the inlet to the freeze barrel 44, thereby to selectively carbonate the chilled beverage mixture in accordance with the solenoid shut-off valve 119 being open or closed and the setting of the manifold second $CO_2$ pressure regulator, whereby either carbonated or non-carbonated beverages may selectively be frozen in the barrel 44. An outlet from a third one of the manifold $CO_2$ pressure regulators is coupled to the upper opening to the expansion tank 122, the lower opening to which is coupled to the water/syrup mixture line extending between the outlet from the pre-chiller 52 and inlet to the freeze barrel 44. For service of frozen carbonated beverages, the manifold second $CO_2$ pressure regulator accommodates adjustment of the carbonation level in the barrel 44 by enabling the introduction of $CO_2$ into the barrel for a brief period before a mixture of water and syrup is delivered into the barrel. The pressure transducer 124 monitors the pressure of the beverage mixture introduced into the barrel and, as is understood by those skilled in the art, when the pressure transducer detects a selected lower cut-in pressure in the barrel 44, for example 23 psi, the brixing valves 102, 84 are opened for delivery of a water/syrup beverage mixture to the barrel, until the pressure transducer detects an upper cut-out pressure in the barrel, for example 29 psi, in response to which the brixing valves are closed. As the water and syrup mixture freezes in the barrel 44, it expands and backs up into the expansion chamber 122.

Since the FCB dispenser 140 includes the freeze barrel 48, it also includes further structure (not shown) that is generally duplicative of the structure shown to the right of the pair of water and syrup brixing valves 102, 84, which accommodates delivery of a water and syrup mixture from the brix valves 104, 87 to the barrel 48, except that the beverage mixture does not flow through a separate pre-chiller, but instead flows through an associated beverage circuit of the pre-chiller 52. In addition, the line 126 at the output from the manifold third $CO_2$ pressure regulator delivers $CO_2$ to an upper opening to an expansion chamber, a lower opening from which is coupled to the inlet to the barrel 48, and to accommodate carbonating the beverage mixture delivered to the barrel 48, the outlet from a fourth $CO_2$ pressure regulator of the manifold 118 is coupled through the solenoid shut-off valve 128, the $CO_2$ orifice 130 and the $CO_2$ check valve 132 to the chilled beverage mixture intermediate the pre-chiller 52 and the inlet to the barrel 48.

Figure 5:
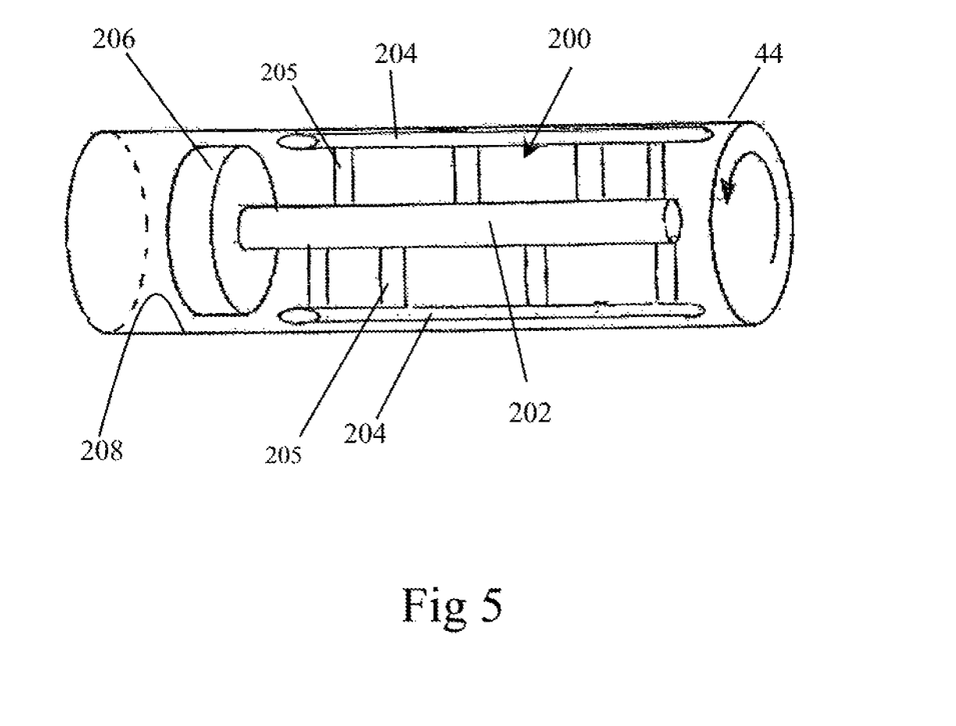
FIG. 5 shows a beater bar and scraper assembly positioned within a freeze barrel for rotation within the barrel by a drive motor.

A beater bar and scraper assembly is provided within each freeze barrel 44 and 48 of the FCB dispenser 80 of FIG. 3 and the FCB dispenser 140 of FIG. 5, and each beater bar and scraper assembly is rotated by an associated motor in order to scrape thin iced or frozen layers of the beverage or food product from the inner surface of its associated barrel. One such beater bar and scraper assembly is shown in FIG. 5 and indicated generally at 200. The assembly includes a beater bar 202 and a plurality of scrapers 204 located radially outward from and extending generally parallel to the beater bar and attached to the beater bar radially extending by arms 205. An electric drive motor 206 has an output coupled to the beater bar 202 to rotate the beater bar and scraper assembly, and the scrapers 204 are positioned closely spaced from an inner surface 208 of the freeze barrel 44, so that upon rotation of the beater bar and scraper assembly, the scrapers remove or shave thin iced or frozen layers of the frozen food product from the freeze barrel inner surface. The motor 206 is shown as being located within the freeze barrel, and the arrangement may be of a type as taught by U.S. Pat. No. 6,163,095, the teachings of which are incorporated herein by reference. An advantage of the arrangement is that no dynamic seal is needed, as compared to the situation where the beater bar extends through an end wall of the freeze barrel for connection to a motor. However, it is contemplated that the drive motor can be located outside of the freeze barrel, in which case a dynamic seal would be required. Although not specifically shown, it is understood that the freeze barrel 48 is provided with a separate beater bar and scraper assembly 200 and drive motor 206.

In a typical conventional application, a beater bar and scraper assembly is rotated by a drive motor at a fixed rotational speed, which customarily is selected such that the rotating speed of the beater bar and scraper assembly is sufficiently fast to satisfy the highest drink draw rate demand, so that frozen product is always available for service to customers. This conventional practice causes the beater bar and scraper assembly to often be rotated faster than is necessary for currently existing drink demand levels that do not require such a high speed of rotation of the assembly. Accordingly, in improving upon the prior art, the invention provides an adaptive controller for a drive motor of a beater bar and scraper assembly that controls the speed of operation of the motor in a manner to decrease beater bar and scraper assembly rotational speed during periods of demand where high speeds are not required or desired. In essence, the drive motor is operated to rotate the beater bar scraper assembly at a speed that is in accordance with and appropriate for the then existing operating conditions of the frozen product dispenser. Examples of dispenser operating conditions under which a lower motor speed could be used are during defrost of a freeze barrel, although as mentioned it may be advantageous to operate the drive motor at a high speed during defrost to facilitate and shorten the time of the defrost cycle, or at other times when the refrigeration cooling load on the freeze barrel is low or off, which may be determined by the setting of an adjustable expansion valve at the inlet to the evaporator for chilling the freeze barrel.

Figure 6:
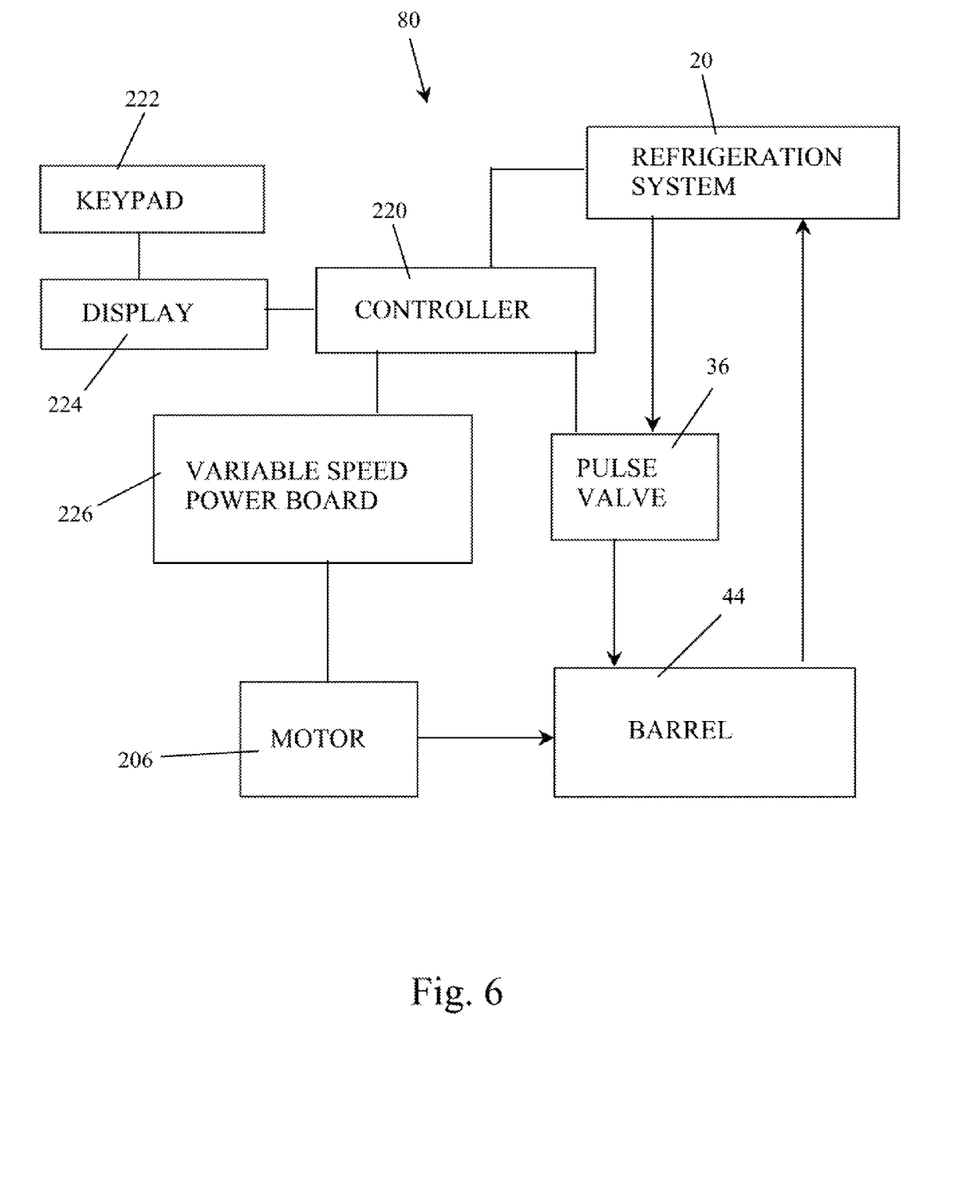
FIG. 6 is block diagram representation of a frozen product dispenser embodying the teachings of the present invention.

FIG. 6 shows an arrangement of the frozen product dispenser 80, in which the speed of operation of the beater bar and scraper assembly drive motor 206 is variably controlled to be in accordance with the then existing operating conditions of the dispenser. The dispenser 80 includes the refrigeration system 20 that delivers refrigerant through the electronically controlled expansion valve 36 to the inlet to the evaporator for the freeze barrel 44, which refrigerant returns to the refrigeration system after flowing through and exiting the evaporator. The expansion valve 36 may be of the stepper motor driven type or, as shown, of the pulse valve modulated type. The metering setting of the expansion valve is determined by a controller 220, which controller also controls operation of the refrigeration system 20. A keypad 222 and display 224 accommodate input of information by a user to the dispenser, for example information pertaining to conditions affecting operation of the dispenser, such as the type of frozen beverages to be prepared, whether the beverage is carbonated, etc.

The controller 220 receives inputs representative of various operating conditions and parameters of the frozen product dispenser 80, which information is used by the controller in operation of the dispenser. The controller also provides to a variable speed power board 226 some or all of the information representative of the operating conditions and parameters of the dispenser, which power board controls the application of power to the beater bar and scraper assembly drive motor 206, so as to operate the motor at speeds selected to be in accordance with the then occurring operating conditions of the dispenser. In this manner, the motor is operated to rotate the beater bar and scraper assembly at speeds no greater than are then required by the dispenser. While in FIG. 6 the beater bar and scraper motor 206 is shown as being located to the exterior of the freeze barrel 44, it is understood that, as shown in FIG. 5, it could be located within the interior of the freeze barrel.

It is contemplated that the drive motor 206 can be operated at a selected one of five different fixed speeds, with the particular speed selected being determined by the then occurring operating conditions of the dispenser 80. It is understood, of course, that fewer or more than five different motor speeds may be used, depending upon the dispenser operating conditions to be satisfied, and that instead of a plurality of different fixed speeds, the motor could be operated at infinitely varied speeds.

Figure 7:
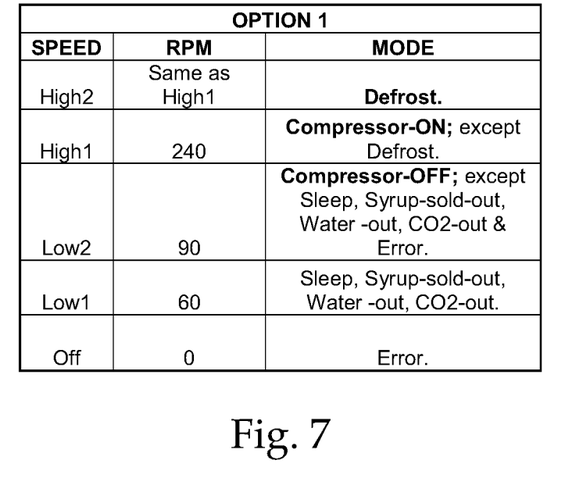
FIGS. 7-12 are tables showing various contemplated manners for controlling the rotational speed of the beater bar and scraper to be in accordance with then occurring operating conditions of the frozen product dispenser.

FIG. 7 shows one contemplated manner of controlling the speed of the drive motor 206 for the beater bar and scraper assembly 200, for operation at a selected one of different fixed speeds in accordance with the then existent operating conditions of the frozen product dispenser 80. The motor speeds are implemented by the variable speed power board 226, with the particular speed being determined in accordance with the value of inputs the power board receives from the controller 220. According to this Option 1, the motor is operated at a High 2 speed, on the order of 240 RPM, when the refrigeration system 80 is in a defrost cycle, and at a High 1 speed, also on the order of 240 RPM, when the refrigeration system compressor 22 is on, except for when the compressor is on while the refrigeration system is in a defrost cycle. For Option 1, the high motor speeds High 1 and High 2 are the same, so the motor is operated at the same high speed whether the refrigeration system is in a chilling or a defrost cycle, although the high speeds could be different. Also, it is to be appreciated that the motor 206 could be turned off or run at a low speed when the refrigeration system is in a defrost cycle, since during defrost it is not required to scrape iced product off of the interior walls of the freeze barrel 44. However, as shown in FIG. 7 it may be advantageous to run the motor at a high speed during a defrost cycle to generate heat within the freeze barrel to facilitate and shorten the time required for defrost. Also for Option 1, the motor may be operated at a Low 2 speed, on the order of 90 RPM, when the refrigeration system compressor is off, except under the conditions of either a sleep cycle of the dispenser, a water-out condition, a $CO_2$-out condition or a system error. The motor may be operated at a Low 1 speed, on the order of 60 RPM, under the condition of either a sleep cycle of the dispenser, a syrup-out condition, a water-out condition or $CO_2$-out. If there is a system error, the motor is turned off.

Figure 8:
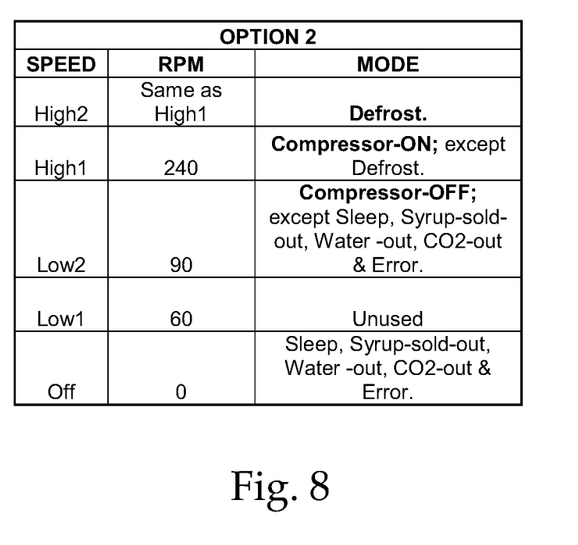

FIG. 8 shows another contemplated manner of controlling the speed of the drive motor 206 for the beater bar and scraper assembly 200. According to Option 2, the motor is operated at a High 2 speed, on the order of 240 RPM, when the refrigeration system 80 is in a defrost cycle, and at a High 1 speed, also on the order of 240 RPM, when the refrigeration system compressor 22 is on, except for when the compressor is on while the refrigeration system is in a defrost cycle, as is the case for Option 1. Again, the motor speeds High 1 and High 2 are the same whether the refrigeration system is in a chilling cycle or a defrost cycle. Also, it is to be appreciated that the motor 206 could be turned off or run at a low speed when the refrigeration system is in a defrost cycle, since during defrost it is not required to scrape iced product off of the interior walls of the freeze barrel 44, but running the motor at a high speed may be advantageous to generate heat within the freeze barrel to facilitate and shorten the time of a defrost cycle. Also, the motor may be operated at a Low 2 speed, on the order of 90 RPM, when the refrigeration system compressor is off, except under the conditions of a sleep cycle of the dispenser, water-out, $CO_2$-out and if there is system error. However, unlike Option 1, it is contemplated that a Low 1 speed not be used, which otherwise would be on the order of 60 RPM. Instead, it is contemplated that the motor be turned off for the conditions of a dispenser sleep cycle, syrup-out, water-out, $CO_2$-out and system error.

Figure 9:
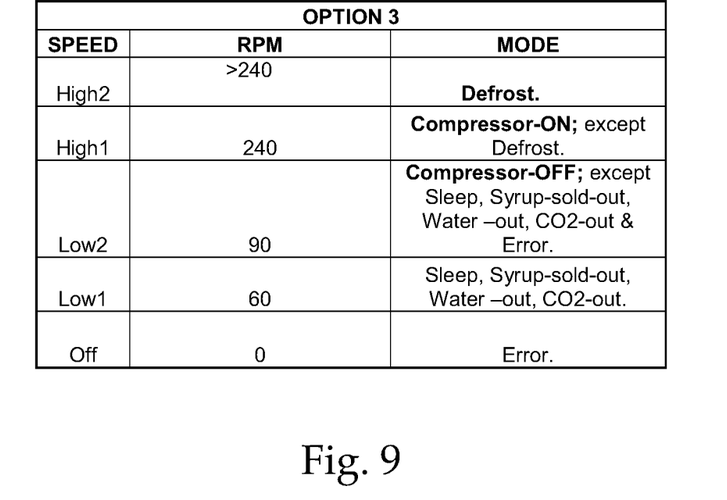

FIG. 9 shows a further contemplated manner of controlling the speed of the beater bar and scraper assembly drive motor 206. According to this Option 3, the motor is operated at a High 2 speed, greater than 240 RPM, when the refrigeration system 80 is in a defrost cycle, and at a slower High 1 speed, on the order of 240 RPM, when the refrigeration system compressor 22 is on, except for when the compressor is on incident to a defrost cycle. As for Options 1 and 2, it is to be appreciated that the drive motor 206 could be turned off or run at a low speed when the refrigeration system is in a defrost cycle. Also, the drive motor may be operated at a Low 2 speed, on the order of 90 RPM, when the refrigeration system compressor is off under the compressor is off under the conditions of a sleep cycle of the dispenser, water-out, $CO_2$-out and if there is an error in the system, and the drive motor may be operated at a Low 1 speed, on the order of 60 RPM, under the conditions of a sleep cycle of the dispenser, syrup-out, water-out and $CO_2$-out. If there is a system error, the motor may be turned off.

Figure 10:
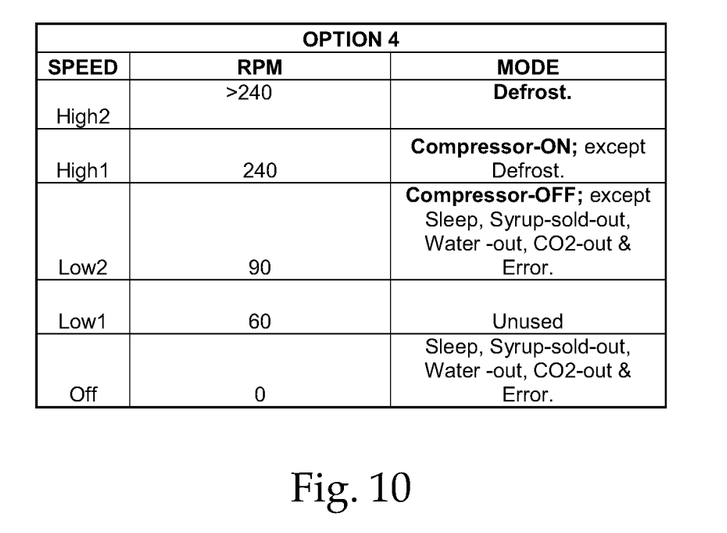

FIG. 10 shows yet another contemplated manner of controlling the speed of the beater bar and scraper assembly drive motor 206. According to this Option 4, the motor is operated at a High 2 speed, greater than 240 RPM, when the refrigeration system 80 is in a defrost cycle, and at a lower High 1 speed, on the order of 240 RPM, when the refrigeration system compressor 22 is on, except for when the compressor is on incident to a defrost cycle. As for Options 1, 2 and 3, the drive motor 206 can, if desired, be turned off or run at a slow speed when the refrigeration system is in a defrost cycle. Also, the drive motor may be operated at a Low 2 speed, on the order of 90 RPM, when the refrigeration system compressor is off, except under the conditions of a sleep cycle of the dispenser, water-out, syrup-out, $CO_2$-out and if there is a system error. Low 1 speed, which would otherwise be on the order of 60 RPM, is not used, and instead the motor is turned off during a sleep cycle of the dispenser and also under the conditions of syrup-out, water-out, $CO_2$-out and if there is an error in the system.

Figure 11:
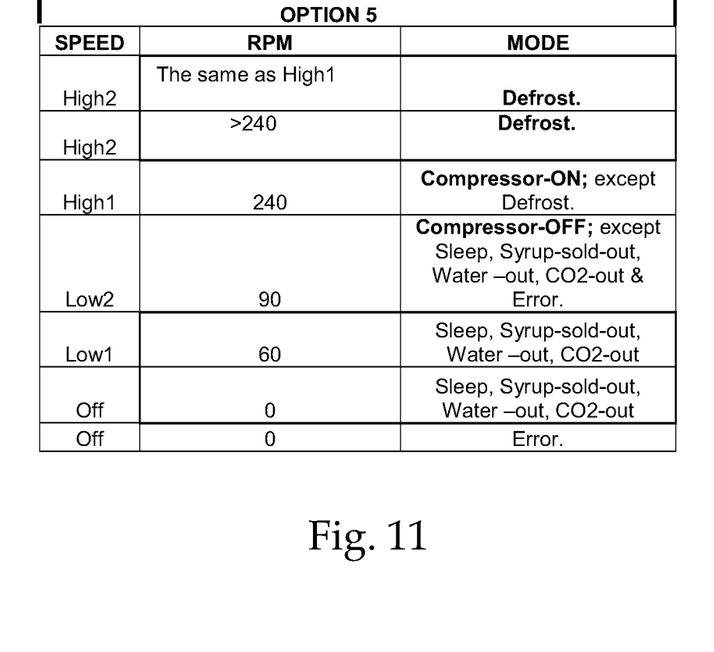

FIG. 11 shows yet another contemplated manner of controlling the speed of the beater bar and scraper assembly drive motor 206. Here, according to an Option 5, the motor may be operated at one of two different High 2 speeds, either 240 RPM or greater than 240 RPM, when the refrigeration system 80 is in a defrost cycle, and at a High 1 speed, on the order of 240 RPM, when the refrigeration system compressor 22 is on, except for when the compressor is on incident to performance of a defrost cycle. As for the other manners of operation of the drive motor, the motor can be turned off or run at a slow speed when the refrigeration system is in a defrost cycle, but it is contemplated that the motor be run at a high speed to facilitate and shorten the time required for defrost. Also, the motor may be operated at a Low 2 speed, on the order of 90 RPM, when the refrigeration system compressor is off, except under the conditions of a sleep cycle of the dispenser, syrup-out, water-out, $CO_2$-out and system error. In addition, the motor may either be operated at a Low 1 speed, on the order of 60 RPM, or may be turned off, under the conditions of a sleep cycle of the dispenser, syrup-out, water-out and $CO_2$-out. If there is an error in the system, the motor is turned off.

Figure 12:
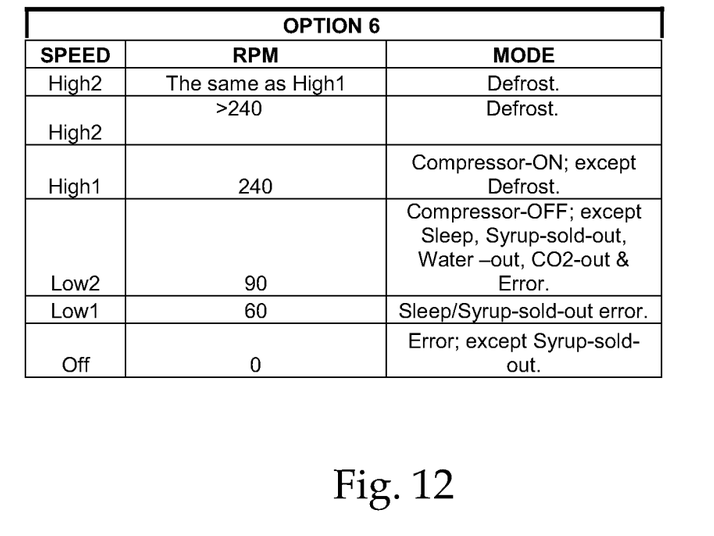

FIG. 12 shows a further contemplated manner of controlling the speed of the beater bar and scraper drive motor 206. Here, according to an Option 6, the motor may be operated at one of two different High 2 speeds, either 240 RPM or greater than 240 RPM, when the refrigeration system 80 is in a defrost cycle, and at a High 1 speed, on the order of 240 RPM, when the refrigeration system compressor 22 is on, except for when the compressor is on incident to performance of a defrost cycle. As for the other manners of operation of the drive motor, the motor can be turned off or run at a slow speed when the refrigeration system is in a defrost cycle, but it is also contemplated that the motor be run at a high speed to facilitate and shorten the time required for defrost. Also, the motor may be operated at a Low 2 speed, on the order of 90 RPM, when the refrigeration system compressor is off, except under the conditions of a sleep cycle of the dispenser, syrup-out, water-out, $CO_2$-out and system error, and at a Low 1 speed, on the order of 60 RPM, under the conditions of a dispenser sleep cycle, syrup-out and system error. If there is an error in the system, except for syrup-out, the motor is turned off.

The invention therefore provides for improved operation of a motor driven beater bar and scraper assembly for a freeze barrel of a frozen product dispenser, in that the beater bar and scraper assembly is not always rotated at the same maximum speed as would be required under the circumstance of a maximum frozen product draw demand, but instead is operated selected ones of a number of different speeds, or is turned off, depending upon the particular operating conditions and requirements of a frozen product dispenser. Specifically, the adaptive controller operates the motor driven beater bar and scraper assembly at selected ones of a plurality of different speeds, which speeds are selected to be in accordance with the then existing operating parameters of the frozen product dispenser, but at no faster a speed than is required for the particular operating parameters or conditions. The different speeds of the beater bar and scraper assembly may be achieved by using a motor, such as the motor 206, that may be operated at different selected speeds, or by using a constant speed motor with an appropriate gearbox or pulley arrangement, the rotational output of speed of which may be varied, as is apparent to one skilled in the art.

It is to be appreciated that while the frozen product dispenser and use of the adaptive control of the invention have been described primarily in terms of a beverage product that comprises a mixture of a beverage syrup or concentrate and a diluent for the syrup, the adaptive control of the invention could just as readily be used with a frozen product dispenser for dispensing a product that does not consist of multiple components delivered to a freeze barrel, such as a product comprising orange juice, grapefruit juice, etc.

While embodiments of the invention have been described in detail, various modifications and other embodiments thereof may be devised by one skilled in the art without departing from the spirit and scope of the invention, as defined in the appended claims.

What is claimed is:

1. A frozen product dispenser, comprising:
    a freeze barrel;
    means for delivering liquid product to said freeze barrel;
    a refrigeration system operable in a chilling cycle to freeze product in said freeze barrel and in a defrost cycle to defrost product in said freeze barrel;
    a scraper in said freeze barrel;
    means for rotating said scraper in said freeze barrel;
    means for sensing values of at least two different operating parameters of said refrigeration system; and
    an adaptive control responsive to the sensed values of the at least two different operating parameters of said refrigeration system for controlling said means for rotating to rotate said scraper in said freeze barrel at at least two different greater than zero fixed speeds;
    wherein:
    said refrigeration system has a compressor that is cycled on and off in operation of said refrigeration system;
    the product is a beverage product;
    said means for delivering liquid product to said freeze barrel comprises means for delivering to said freeze barrel a beverage syrup from a source of beverage syrup and a diluent for the syrup from a source of diluent; and
    including means for carbonating the beverage product with carbonating gas from a source of carbonating gas;
    wherein said adaptive control is responsive to:
    a first one of said operating parameters comprising said refrigeration system operating in a defrost cycle to control said means for rotating to rotate said scraper in said freeze barrel at a first speed;
    a second one of said operating parameters comprising said compressor being on, except during a defrost cycle of said refrigeration system, to control said means for rotating to rotate said scraper in said freeze barrel at a second speed;
    a third one of said operating parameters comprising said compressor being off, except upon occurrence of exhaustion of a source of anyone of the syrup, diluent and carbonating gas, to operate said means for rotating to rotate said scraper in said freeze barrel at a third speed; and
    a fourth one of said operating parameters comprising the exhaustion of a source of anyone of the syrup, diluent and carbonating gas to control said means for rotating to rotate said scraper in said freeze barrel at a fourth speed.

2. The frozen product dispenser as in claim 1, wherein:
    said first relatively high speed is at least equal to said second relatively high speed; and
    said third relatively low speed is greater than said fourth relative low speed.

3. The frozen product dispenser as in claim 1, wherein said fourth relatively low speed is zero.

4. The frozen product dispenser as in claim 1, wherein said first relatively high speed is greater than said second relatively high speed.

5. The frozen product dispenser as in claim 1, wherein said adaptive control is responsive to said sensed values of said operating parameters to control said means for rotating to rotate said scraper in said freeze barrel at said selected ones of said at least two different speeds, but at no faster a speed than is required for the then sensed values of the parameters.

6. A method of operating a frozen product dispenser, said method comprising:
    delivering liquid product to a freeze barrel of the dispenser;
    operating a refrigeration system in a chilling cycle to freeze product in the freeze barrel and in a defrost cycle to defrost product in the freeze barrel;
    sensing values of at least two different operating parameters of the refrigeration system;
    rotating a scraper in the freeze barrel; and
    adaptively controlling, in response to the sensed values of the parameters, operation of said rotating step to rotate the scraper in the freeze barrel at at least two different greater than zero fixed speeds;
    wherein:
    the refrigeration system has a compressor that is cycled on and off in operation of the refrigeration system;
    the product is a beverage product;
    said delivering step comprises the steps of delivering to the freeze barrel a beverage syrup from a source of beverage syrup and a diluent for the syrup from a source of diluent; and
    including the step of carbonating the beverage product with carbonating gas from a source of carbonating gas
    wherein said adaptive controlling step is responsive to:
    a first one of the operating parameters comprising the refrigeration system operating in a defrost cycle to control said rotating step to rotate the scraper in the freeze barrel at a first speed;
    a second one of the operating parameters comprising the compressor being on, except during a defrost cycle of the refrigeration system, to control said rotating step to rotate the scraper in the freeze barrel at a second speed;
    a third one of the operating parameters comprising the compressor being off, except upon occurrence of exhaustion of a source of anyone of the syrup, diluent and carbonating gas, to control said rotating step to rotate the scraper in the freeze barrel at a third speed; and a fourth one of the operating parameters comprising the exhaustion of a source of anyone of the syrup, diluent and carbonating gas to control said rotating step to rotate the scraper in the freeze barrel at a fourth speed.

7. The method as in claim 6, wherein:

the first relatively high speed is at least equal to the second relatively high speed; and the third relatively low speed is greater than the fourth relatively low speed.

8. The method as in claim 6, wherein the fourth relatively low speed is zero.

9. The method as in claim 6, wherein the first relatively high speed is greater than the second relatively high speed.

10. The method as in claim 6, wherein said adaptively controlling is responsive to the sensed values of the operating parameters to control said rotating step to rotate the scraper in the freeze barrel at selected ones of the at least two different speeds, but at no faster a speed than is required for the then sensed values of the operating parameters.

* * * * *